US011391831B2

(12) United States Patent
Niesen et al.

(10) Patent No.: US 11,391,831 B2
(45) Date of Patent: Jul. 19, 2022

(54) ASSOCIATION AWARE RADAR BEAMFORMING

(71) Applicant: QUALCOMM Incorporated, San Diego, CA (US)

(72) Inventors: Urs Niesen, Berkeley Heights, NJ (US); Jayakrishnan Unnikrishnan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 16/390,786

(22) Filed: Apr. 22, 2019

(65) Prior Publication Data

US 2019/0331784 A1    Oct. 31, 2019

Related U.S. Application Data

(60) Provisional application No. 62/662,596, filed on Apr. 25, 2018.

(51) Int. Cl.
*G01S 13/04*    (2006.01)
*G01S 13/931*   (2020.01)
(Continued)

(52) U.S. Cl.
CPC ............ *G01S 13/04* (2013.01); *G01S 7/4008* (2013.01); *G01S 7/411* (2013.01); *G01S 13/931* (2013.01); *G01S 2013/0254* (2013.01)

(58) Field of Classification Search
CPC ...... G01S 13/931; G01S 13/44; G01S 13/003; G01S 13/87; G01S 7/4026; G01S 13/42;
(Continued)

(56) References Cited

U.S. PATENT DOCUMENTS 4,336,540 A      6/1982   Goodwin et al.
5,964,822 A *   10/1999   Alland .................... G01S 13/42
                                                                 701/301
(Continued)

OTHER PUBLICATIONS

International Search Report and Written Opinion—PCT/US2019/028657—ISA/EPO—dated Sep. 9, 2019 (1819556WO).
(Continued)

*Primary Examiner* — Olumide Ajibade Akonai
(74) *Attorney, Agent, or Firm* — Arent Fox, LLP

(57) ABSTRACT

The present disclosure provides methods and systems for radar detection. A radar device may obtain prior information about known targets including an azimuth angle of each known target. The radar device may generate an association aware transmit beam pattern toward at least a subset of the known targets based on the prior information. The radar device may detect targets from reflected beams of the association aware transmit beam pattern. Generating the association aware transmit beam pattern may include generating a partial ambiguity graph for the known targets, the graph including at least one edge connecting two known targets wherein a difficulty of disambiguating the two known targets is greater than a threshold. The graph also includes at least two known targets that are not connected by an edge.

26 Claims, 8 Drawing Sheets

(51) Int. Cl.
*G01S 7/41* (2006.01)
*G01S 7/40* (2006.01)
*G01S 13/02* (2006.01)

(58) Field of Classification Search
CPC ........... G01S 2013/0254; G01S 7/2813; G01S 7/403; G01S 7/4052; G01S 2013/0245; G01S 7/40; G01S 7/4091; G01S 7/411; G01S 13/04; G01S 7/4008; G01S 13/726; H01Q 17/001
USPC .............................. 342/149, 158, 174, 73, 74
See application file for complete search history.

(56) References Cited

U.S. PATENT DOCUMENTS

| | | | |
|---|---|---|---|
| 10,809,355 B2 * | 10/2020 | Liu | G01S 13/87 |
| 2007/0008210 A1 | 1/2007 | Kibayashi et al. | |
| 2009/0066562 A1 * | 3/2009 | Aites | G01S 13/9054 342/25 F |
| 2015/0355313 A1 | 12/2015 | Li et al. | |
| 2016/0334511 A1 * | 11/2016 | Ling | G01S 7/0236 |
| 2019/0187268 A1 * | 6/2019 | Lien | G01S 13/422 |

OTHER PUBLICATIONS

Reid D.B., "An Algorithm for Tracking Multiple Targets", IEEE Transactions on Automatic Control, IEEE Service Center, Los Alamitos, CA, US, vol. AC-24, No. 6, Dec. 1, 1979 (Dec. 1, 1979), pp. 843-854, XP009110568, ISSN: 0018-9286 abstract.

* cited by examiner

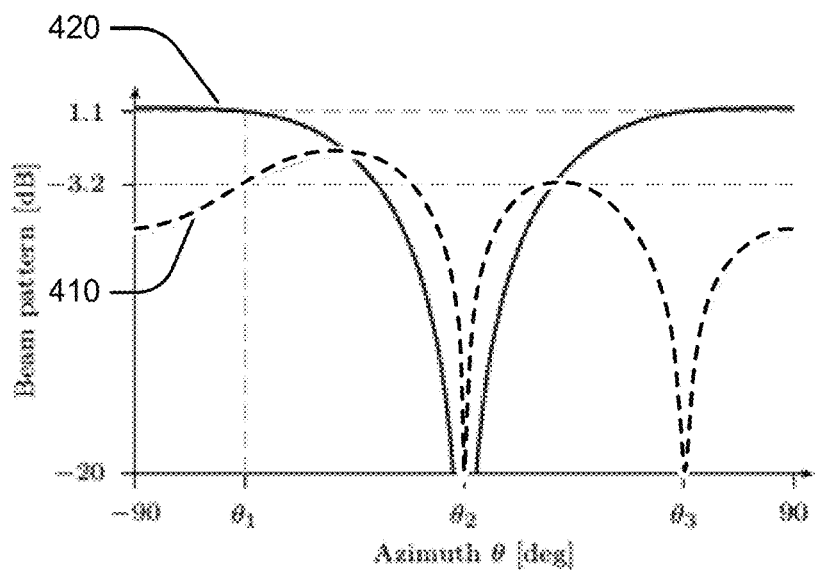
FIG. 4A  $|a^\dagger(\theta)Ra(\theta_3)|$
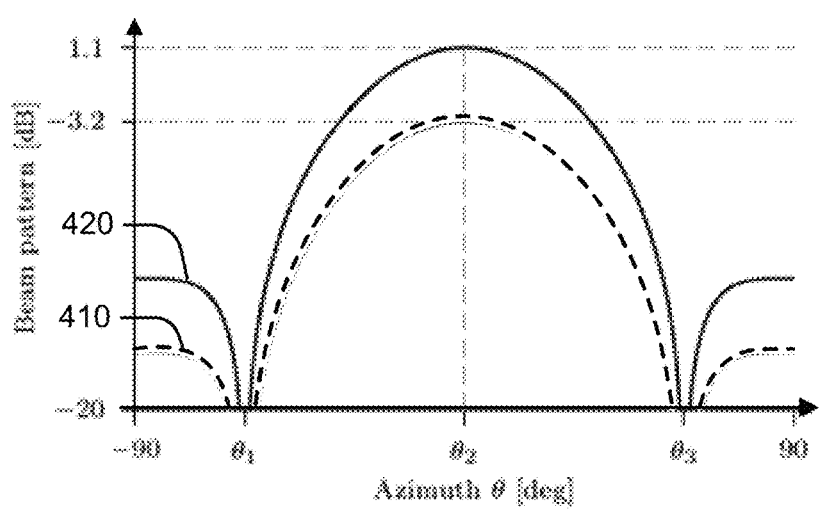
FIG. 4B  $|a^\dagger(\theta)Ra(\theta_2)|$
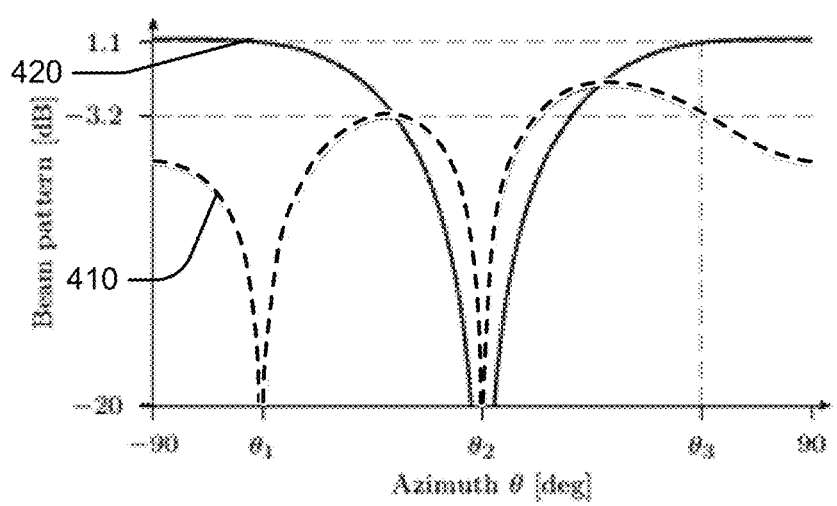
FIG. 4C  $|a^\dagger(\theta)Ra(\theta_3)|$

ASSOCIATION AWARE RADAR BEAMFORMING

CLAIM OF PRIORITY UNDER 35 U.S.C. § 119

This application claims priority to U.S. Provisional Application No. 62/662,596 titled "ASSOCIATION AWARE RADAR BEAMFORMING," filed Apr. 25, 2018, which is assigned to the assignee hereof, and incorporated herein by reference in its entirety.

BACKGROUND

Aspects of the present disclosure relate generally to radar, and more particularly, to beamforming for radar.

Multi-antenna radar systems can broadly be classified into two categories: phased arrays radars, in which phase-shifted versions of the same signal are emitted from the antennas, and multiple-input, multiple-output (MIMO) radar, in which general signals can be emitted from the antennas. The increased adaptability of MIMO radar offers significant advantages over phased-array radar, including increased identifiability and flexibility in transmit beam pattern design.

A number of prior works have studied the problem of designing emitted signals for MIMO radar systems to create desired transmit beam patterns. The methods described in the prior works vary in the amount of prior target information obtained from track filters at the receiver utilized to create the desired transmit beam patterns. Some methods do not use any prior target information and focus on creating beam patterns with wide coverage. Some methods create beam patterns adapted to the tracked azimuth angles to the targets. One such method designs the beam pattern using a two step-process, which first selects a cross-correlation matrix to achieve a desired beam pattern and then chooses signals having that correlation. This two-step process couples the design of the spatial and temporal signal dimensions. Another method decouples the spatial and temporal dimensions of the beamforming design. Another class of methods adopts a beam-space approach to beamformer designs, which aims to combine the benefits of phased-array and MIMO radar. For example, subarrays may be separately designed such that each subarray acts as a phased array. Another approach limits sidelobes within tolerable levels in prescribed regions. Beamformer designs may also address mismatches between the presumed and actual beamforming vectors.

In the automotive context, beamforming has also been studied from the perspective of interference avoidance. A few recently proposed methods have adapted beam patterns for improved detection. Some methods focus on adapting waveforms to account for change in clutter in the radar scene, while other methods focus on adaptive beamforming to improve tracking. One proposal is to sequentially adapt the beam pattern to improve the conditional Bayesian Cramer-Rao bound in a single target tracking problem. Adaptive beamforming schemes may also be applied to multiple target tracking.

The different beamforming methods described above either implicitly or explicitly assume that the data association problem can be solved without errors (i.e., detections can correctly be associated to targets). Beamforming patterns are designed to maximize detection and estimation accuracy under this assumption. This association, however, may not always be true. Thus, improvements in radar beamforming may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of radar detection. The method may include obtaining prior information about known targets including an azimuth angle of each known target. The method may include generating an association aware transmit beam pattern toward at least a subset of the known targets based on the prior information. The method may include detecting targets from reflected beams of the association aware transmit beam pattern.

In another aspect, the disclosure provides a radar including a plurality of antennas, a memory storing executable instructions, and a processor communicatively coupled with the plurality of antennas and with the memory. The processor may be configured to obtain prior information about known targets including an azimuth angle of each known target. The processor may be configured to generate an association aware transmit beam pattern toward at least a subset of the known targets based on the prior information. The processor may be configured to detect targets from reflected beams of the association aware transmit beam pattern.

In another aspect, the disclosure provides a radar including means for obtaining prior information about known targets including an azimuth angle of each known target. The radar may include means for generating an association aware transmit beam pattern toward at least a subset of the known targets based on the prior information. The radar may include means for detecting targets from reflected beams of the association aware transmit beam pattern.

In another aspect, the disclosure provides a computer-readable medium storing instructions executable by a processor of a radar device. The computer-readable medium may include code for obtaining prior information about known targets including an azimuth angle of each known target. The computer-readable medium may include code for generating an association aware transmit beam pattern toward at least a subset of the known targets based on the prior information. The computer-readable medium may include code for detecting targets from reflected beams of the association aware transmit beam pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4A is a chart showing an example beam pattern for a first azimuth angle;

FIG. 4B is a chart showing an example beam pattern for a second azimuth angle;

FIG. 4C is a chart showing an example beam pattern for a third azimuth angle;

DETAILED DESCRIPTION

Figure 1:
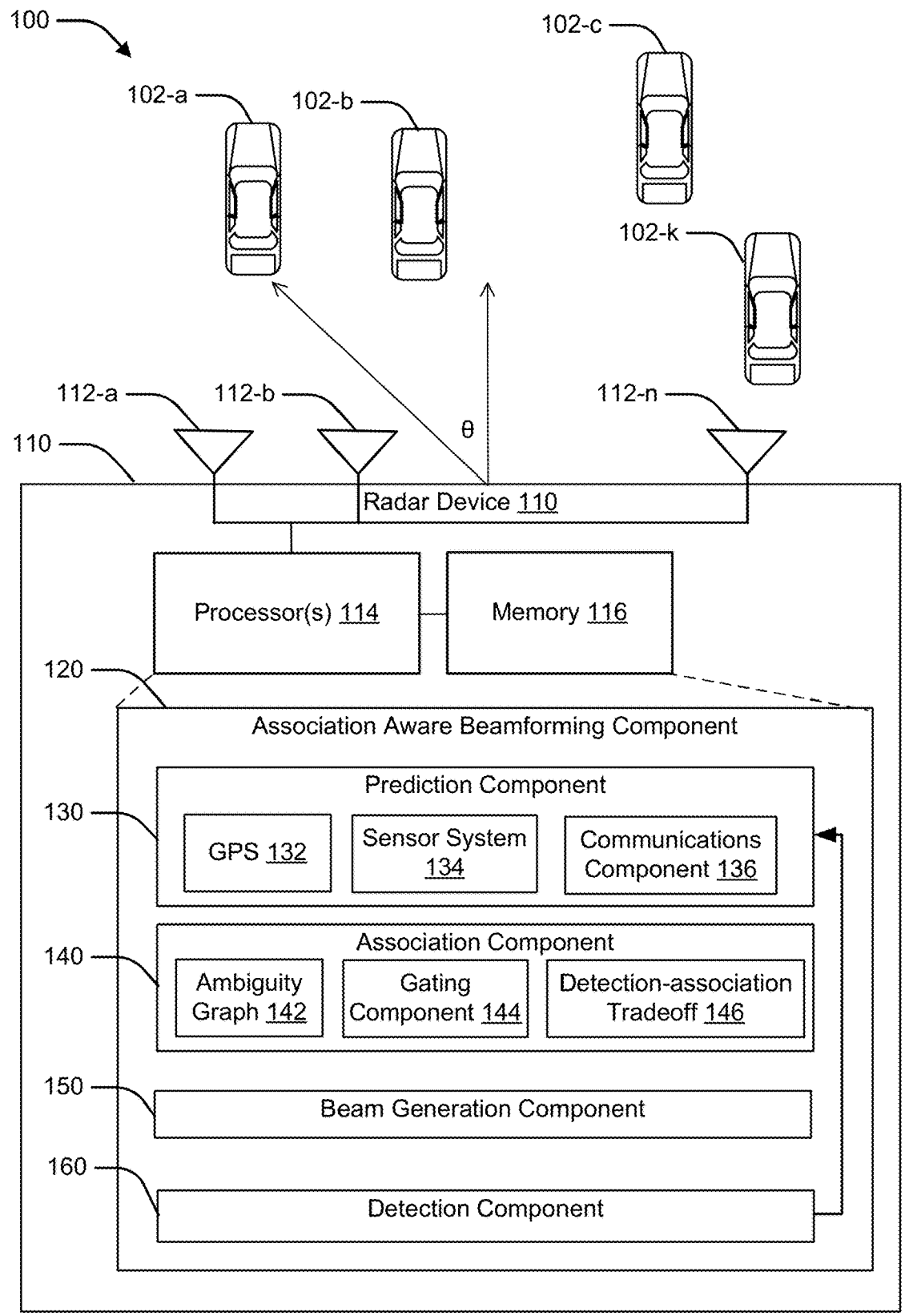
FIG. 1 is a schematic diagram of an example operating environment of a radar device that detects objects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to radar sensors, and in particular to radar sensors using multiple transit and receive antennas in a MIMO radar system. A radar system may detect and track multiple targets located in an operating environment of the radar system.

More specifically, the disclosure addresses at least a problem relating to tracking parameters of radar targets using a MIMO radar system with N antennas. An antenna may include one or more antennas, antenna elements, and/or antenna arrays. Various antenna designs and corresponding transmission techniques for arrays of antennas and antenna elements are well known. The radar system may track the parameters of K targets from the received signal y(t). A conventional radar receiver architecture uses a matched filter bank, with each filter tuned to one particular parameter triple. A common procedure for tracking the parameters ($\tau_k$, $\omega_k$, $\theta_k$) for the K targets includes two steps, a detection step followed by an association step. In the detection step, the radar device detects the targets. The detection may include thresholding the matched filter outputs above some threshold to determine that an object has been detected. In the second step, the radar device associates each such detection ($\hat{\tau}$, $\hat{\omega}$, $\hat{\theta}$) with a target track. The target track may be compared with previous target tracks to determine a trajectory of an object.

In an aspect, the present disclosure improves the performance of the radar by using a beamform for the detection step that is based on the difficulty or ambiguity of the association step. For example, an ambiguity graph may be used to represent the difficulty of the association step by identifying pairs of targets where association may be ambiguous. When an ambiguity graph is used to select a beamform, the signal to noise ratio (SNR) and/or the probability of correct association ($P_c$) may be improved. There may be a tradeoff between SNR and $P_c$. By determining Pareto-optimal ambiguity graphs, an ambiguity graph may be selected efficiently.

Additional features of the present aspects are described in more detail below with respect to FIGS. 1-10. The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example operational scenario 100 for a radar device 110. In an aspect, the radar device 110 may be used in an automotive scenario to track surrounding objects 102 such as other vehicles. The objects 102 may be designated herein as 102-a, 102-b, 102-c, ..., 102-k, where k is a maximum number of trackable objects. The radar device 110, however, may be utilized in other scenarios where tracking of multiple objects is desired, e.g., aircraft, drones, or robotics.

The radar device 110 may include multiple antennas 112, which may be designated herein as 112-a, 112-b, ..., 112-n, where N is the total number of antennas. The radar device 110 may operate as a MIMO system. Generally, the radar device 110 may transmit a radar beam defined by a beamforming matrix from the antennas 112. The radar beam may reflect off the objects 102, and the radar device 110 may receive the reflected radar signals via the antennas 112. The radar device 110 may analyze the reflected radar signals to detect and track the objects 102.

The radar device 110 may include a processor 114 that executes instructions stored in memory 116. For example, the processor 114 may execute an operating system and/or one or more applications, which may include an association aware beamforming component 120.

The memory 116 may be configured for storing data and/or computer-executable instructions defining and/or associated with the association aware beamforming component 120, and processor 114 may execute the association aware beamforming component 120. Memory 116 may represent one or more hardware memory devices accessible to radar device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by processor 114. In an implementation, the memory 116 may include a storage device, which may be a non-volatile memory.

The processor 114 may include one or more processors for executing instructions. An example of processor 114 can include, but is not limited to, any processor specially programmed as described herein, including a controller, microcontroller, application specific integrated circuit (ASIC), field programmable gate array (FPGA), system on chip (SoC), or other programmable logic or state machine. The processor 114 may include other processing components such as an arithmetic logic unit (ALU), registers, and a control unit. The processor 114 may include multiple cores and may be able to process different sets of instructions and/or data concurrently using the multiple cores to execute multiple threads.

The radar device 110 may include an association aware beamforming component 120 that determines the beam to transmit based on an association difficulty of the targets. Generally, the radar device 110 seeks to transmit a beam that avoids simultaneously illuminating targets where the association is difficult. For example, object 102-c and object 102-k may be difficult to correctly associate to different tracks due to their relatively close positions, whereas the radar device 110 may more easily associate object 102-a and object 102-k to different tracks due to a relatively larger spatial separation between the objects. In an aspect, to avoid simultaneously illuminating objects, the beamforming matrix is generated to include a null in the direction of one or more of the objects. The creation of the nulls, however, may reduce SNR and/or a total number of objects that can be detected from the beam. Therefore, by considering the difficulty of an association problem when selecting a beamform (and avoiding nulls when not necessary), the radar device 110 may improve SNR and/or the total number of objects that can be detected.

The association aware beamforming component 120 may include a prediction component 130 configured to obtain prior information about known targets including an azimuth angle of each known target, an association component 140 configured to generate an ambiguity graph for the known targets, a beam generation component 150 configured to generate an association aware transmit beam pattern toward at least a subset of the known targets based on the prior information, and a detection component 160 configured to detect targets from reflected beams of the transmitted beam pattern.

The prediction component 130 may determine prior information about the objects 102 including an azimuth angle $\theta$. The prediction component 130 may include a global positioning system (GPS) 132, sensor system 134, and/or a communications component 136, or have access to information from such components. The GPS 132 may output a geographic location of the radar device 110 based on signals received from satellites. The sensor system 134 may include a camera, light detection and ranging (LIDAR) system, laser detection and ranging (LADAR), inertial measurement unit (IMU), and/or other sensors that may be used to estimate a position of the radar device 110 or an object 102. Accordingly, the prediction component 130 may estimate the azimuth angle $\theta$ from the radar device 110 to the object 102 based on the relative positions of the radar device 110 and the object 102. In another aspect, the detection component 160 may also provide information from previous detections to the prediction component 130 to estimate the azimuth angle $\theta$. The prediction component 130 may determine a trajectory of each object 102 and predict a position of the object 102. The estimates of position and/or azimuth angle $\theta$ may have limited precision. In an aspect, the association aware beamforming component 120 may consider a range for the azimuth angle $\theta$ to account for possible error(s).

The association component 140 may analyze a difficulty of associating reflected beams with targets based on the predicted locations of the objects. The association component 140 may generate an ambiguity graph 142. The ambiguity graph 142 may include a node corresponding to each tracked target. The ambiguity graph 142 may include an edge connecting two nodes if the likelihood of a detection being incorrectly associated to the other node in the pair is above a threshold. In an aspect, the ambiguity graph 142 may be based on overlapping gates defined by gating component 144. A gate may be a region of parameter space in which the association component 140 expects the true parameters for a fixed target to fall. For example, the gating component 144 may determine gates based on estimated variance in the target parameters. If the gates overlap, the gating component 144 may determine that the likelihood of incorrect association is above the threshold. In another aspect, the association component 140 may select an ambiguity graph along a detection-association tradeoff 146.

The transmit and receive gains of an antenna n at azimuth angle $\theta$ may be denoted as $a^*_n(\theta) \in C$ and $b^*_n(\theta) \in C$. Assuming the antenna array emits a complex, baseband-equivalent, vector-valued signal $s(t) \in C^N$ with $t \in [0,T)$, the corresponding (noiseless, baseband-equivalent) received signal after reflection from a target with unit radar cross-section at range $\tau c/2$, Doppler shift $\omega$, and azimuth angle $\theta$ is:

$$x(t;\tau,\omega,\theta) \triangleq b(\theta)a^\dagger(\theta)s(t-\tau)\exp(j\omega t).$$

For general radar cross-section $h \in C \setminus \{0\}$, the reflected signal is $hx(t, \tau, \omega, \theta)$. The radar cross-section term h includes the path loss. For K targets with parameters $(\tau_k, \omega_k, \theta_k)$ and radar cross-section $h_k$ for $k \in \{1, 2, \ldots, K\}$, the received signal is then $$y(t) \triangleq \sum_{k=1}^{K} h_k x(t; \tau_k, \omega_k, \theta_k) + z(t),$$

where $z(t)$ is appropriately filtered additive Gaussian receiver noise. Further, it may be assumed that the tuples $(\tau_k, \omega_k)$ for $k \in \{1, 2, \ldots, K\}$ are distinct.

The radar device 110 tracks the parameters of these K targets from the received signal $y(t)$. The standard receiver architecture uses a matched filter bank, with each filter tuned to one particular parameter triple. The output of the matched filter tuned to $(\tau, \omega, \theta)$ is $$r(\tau, \omega, \theta) \triangleq \sum_{n=1}^{N} \int_{t=\tau}^{T+\tau} y_n(t) x_n^*(t; \tau, \omega, \theta) dt$$

$$= \sum_{n=1}^{N} \int_{t=\tau}^{T+\tau} y_n(t) s^\dagger(t-\tau) \exp(-j\omega t) dt a(\theta) b_n^*(\theta).$$

The transmitted signal may have the form $s(t) \triangleq W \tilde{s}(t)$ for some matrix $W \in C^{N \times N}$ satisfying $tr(WW^\dagger)=1$ and for some $\tilde{s}(t) \in C^N$ with support $t \in (0,T)$ and with approximate bandwidth B. Here, $\tilde{s}(t)$ has good cross-correlation properties, meaning that $\tilde{s}(t)$ has a matrix-valued ambiguity function $x(\Delta\tau, \Delta\omega) \in C^{N \times N}$ satisfying:

$$x(\Delta\tau, \Delta\omega) \triangleq \int_{t=max\{\Delta\tau,0\}}^{T+min\{\Delta\tau,0\}} \tilde{s}(t) \tilde{s}^\dagger(t-\Delta\tau) \exp(-j\Delta\omega t) dt \approx 1_{(0,0)}(\Delta\tau, \Delta\omega) I$$

-continued where $1_{(0,0)}(\Delta\tau, \Delta\omega) \triangleq \begin{cases} 1, & \text{if } (\Delta\tau, \Delta\omega) = (0, 0) \\ 0, & \text{otherwise} \end{cases}$.

Note that the temporal support T and the bandwidth B of the waveforms place limits of order 1/B on the resolution of the delay $|\Delta\tau|$ and of order 1/T on the resolution of the Doppler shift $\Delta\omega$. The identity x ($\Delta\tau, \Delta\omega$) is to be understood to hold up to those resolution limits. For simplicity, it may be assumed that x($\Delta\tau, \Delta\omega$) holds with equality, i.e., that the ambiguity function is ideal. Under the assumption of ideal ambiguity function, the matched filter output can be simplified to:

$$r(\tau, \omega, \theta) = \sum_{n=1}^{N} \int_{t=\tau}^{T+t} y_n(t) \tilde{s}^\dagger(t-\tau) \exp(-j\omega t) dt W^\dagger a(\theta) b_n^*(\theta) + z(\tau, \omega, \theta)$$

$$= \sum_{k=1}^{K} h_k \sum_{n=1}^{N} b_n(\theta_k) a^\dagger(\theta_k) W \int_{t=max(\tau,\tau_k)}^{T+min(\tau,\tau_k)} \tilde{s}(t-\tau_k) \tilde{s}^\dagger(t-\tau) \exp$$

$$(j(\omega_k - \omega)t) dt W^\dagger a(\theta) b_n^*(\theta) + z(\tau, \omega, \theta)$$

$$= \sum_{k=1}^{K} h_k \exp(-j(\omega-\omega_k)\tau_k) \sum_{n=1}^{N} b_n(\theta_k) a^\dagger(\theta_k) W_\chi(\tau-\tau_k, \omega-\omega_k)$$

$$W^\dagger a(\theta) b_n^*(\theta) + z(\tau, \omega, \theta)$$

$$= \sum_{k=1}^{K} h_k \exp(-j(\omega-\omega_k)\tau_k) 1_{(0,0)}(\tau-\tau_k, \omega-\omega_k) b^\dagger(\theta) b(\theta_k) a^\dagger(\theta_k)$$

$$Ra(\theta) + z(\tau, \omega, \theta),$$

where $R \triangleq WW^\dagger$ is the beamforming matrix, and where z ($\tau, \omega, \theta$) is the filtered receiver noise. R satisfies $tr(R) = tr(WW^\dagger) = 1$.

A common procedure for tracking the parameters ($\tau_k, \omega_k, \theta_k$) for the K targets includes two steps, a detection step followed by an association step. In the first step, the radar device 110 detects the targets. The detection may include thresholding the matched filter outputs $r(\tau, \omega, \theta)$. That is, the radar device finds all (usually sampled) ($\hat{\tau}, \hat{\omega}, \hat{\theta}$) such that $|r(\hat{\tau}, \hat{\omega}, \hat{\theta})|$ is strictly above some threshold. In the second step, the radar device associates each such detection ($\hat{\tau}, \hat{\omega}, \hat{\theta}$) with a target track.

The association component 140 may have prior information from the prediction component 130 about the parameter triple ($\tau_k, \omega_k, \theta_k$). This prior information can be used to define a gate, i.e., a region of parameter space in which the association component 140 expects the true parameters for a fixed target to fall. The radar device 110 may assume that the prior information on the azimuth angle is precise, so that $\theta_k$ is in effect known a priori. With this assumption, the gate $S_k$ for target k is a subset of $R^2$ in which the radar device 110 expects the parameter tuple ($\tau_k, \omega_k$) to fall.

The association component 140 may then implement an association rule as follows. For each track $k \in \{1, 2, \ldots, K\}$ for the K targets, find all detections of the form ($\hat{\tau}, \hat{\omega}, \hat{\theta}$) with ($\hat{\tau}, \hat{\omega}$) $\in S_k$, and $\hat{\theta} = \theta_k$ (which is known a priori). If there is a single such detection, then the radar device 110 associates the single detection with the track for target k. If there are zero or more than one such detections, then the radar device 110 declares an association error. In this association rule, the prior information is used to gate the detections. Further, the detection-to-track association is performed only if this gating removes likely association ambiguity, i.e., the gates do not overlap. While this association rule is quite simple, it includes several standard rules as special cases.

In a case of rectangular gates, the association component 140 can derive lower bounds ($\tau_k^-, \omega_k^-$) and upper bounds ($\tau_k^+, \omega_k^+$) for the parameter tuple ($\tau_k, \omega_k$) from the prior distribution, For example, $\tau_k^+$ could be chosen as the prior mean of $\tau_k$ plus three standard deviations (and similarly for the other bounds). The association component 140 can then construct a standard rectangular gating set $S_k \triangleq [\tau_k^-][\omega_k^-][\omega_k^-,\omega_k^+]$.

Figure 2:
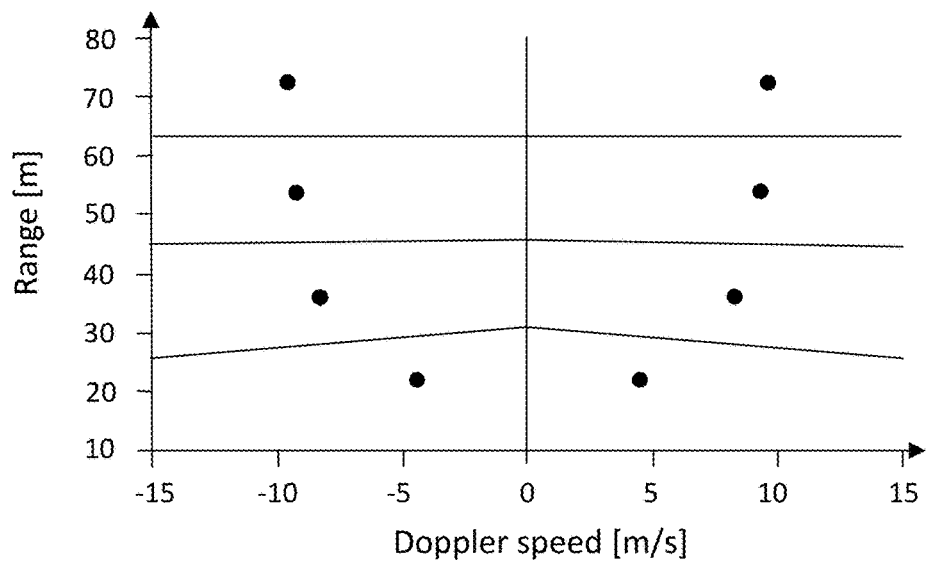
FIG. 2 is a conceptual diagram of example gating sets for determining whether association of objects is ambiguous.

In a case of nearest neighbor gates, $f_k(\tau, \omega)$ may be the prior density on the parameter tuple ($\tau_k, \omega_k$) of target k. The gating set may be defined as $S_k \triangleq \{(\tau, \omega): f(\tau, \omega) > f_{k'}(\tau, \omega)$ for all $k' \neq k\}$. For example, as illustrated in FIG. 2, the resulting gating sets partition the space $R^2$. For Gaussian priors with equal variance, the resulting partition is a Voronoi partition. The corresponding association rule assigns each detection to the track the detection most likely came from. This is the standard nearest-neighbor or greedy association rule.

A set of targets k' that are a priori ambiguous with respect to a target k may be defined as $\varepsilon_k \triangleq \{k' \in \{1, 2, \ldots, K\} \setminus \{k\}: S_{k'} \cap S_k \neq \emptyset\}$.

To understand the interaction between data association and beamforming, in an example scenario, K=2 targets with known azimuth angle $\theta_1$ of target one and $\theta_2$ of target two. Assuming the matched filter outputs $|r(\tau_1, \omega_1, \theta_1)|$, $|r(\tau_1, \omega_1, \theta_2)|$, $|r(\tau_2, \omega_2, \theta_1)|$, $|r(\tau_2, \omega_2, \theta_2)|$ are all above the detection threshold, without any knowledge about ($\tau_1, \omega_1$) and ($\tau_2, \omega_2$), the association component 140 cannot unambiguously solve the association problem. Indeed, ($\tau_1, \omega_1$) could be correctly associated with target one and ($\tau_2, \omega_2$) correctly with target two. However, alternatively, ($\tau_1, \omega_1$) could be incorrectly associated with target two and ($\tau_2, \omega_2$) incorrectly with target one. Without further information, both associations are equally valid from the point of view of radar device 110.

This ambiguity can be resolved in two ways. First, through additional prior information about $\tau_k$ and $\omega_k$. If the gating sets do not intersect (or, equivalently, if $2 \notin \varepsilon_1$), then one of the two alternative data associations is invalidated by the prior information. Second, by designing the transmitted signals to ensure that two of the noiseless matched filter outputs are forced to be less than the detection threshold, $\delta$. That is, $|r(\tau_1, \omega_1, \theta_2)| \leq \delta$ and $|r(\tau_2, \omega_2, \theta_1)| \leq \delta$. Again, one of the two alternative data associations is invalidated by the prior information.

In a general case with K targets, assuming that the received signal is noiseless, and setting the detection threshold to be zero, $r(\hat{\tau}, \hat{\omega}, \hat{\theta})$ is nonzero, and hence a potential target detected, if and only if ($\hat{\tau}, \hat{\omega}$)=($\tau_k, \omega_k$) for some $k \in \{1, 2, \ldots, K\}$ satisfying $$|h_k b^\dagger(\hat{\theta}) b(\theta_k) a^\dagger(\theta_k) Ra(\hat{\theta})| \neq 0.$$

In the resulting association problem, the association rule will assign all detections to tracks without declaring an error if, for every k, there is exactly one tuple ($\hat{\tau}, \hat{\omega}$) inside the gating set $S_k$ for target k such that $r(\hat{\tau}, \hat{\omega}, \theta)$ is nonzero. Accordingly, the association problem has a unique solution if the following two sufficient conditions hold. First, for every $k \in \{1, 2, \ldots, K\}$, $|h_k| \|b(\theta_k)\|^2 a^\dagger(\theta_k) Ra(\theta_k) > 0$, so that the correct target is detected. Second, for every $k \in \{1, 2, \ldots, K\}$ and every $k' \in \varepsilon_k$, $h_k b^\dagger(\theta_{k'}) b(\theta_k) a^\dagger(\theta_k) Ra(\theta_{k'}) = 0$, so that hard to disambiguate targets are not simultaneously illuminated. This second condition ensures that the association is unambiguous. In an aspect, these conditions can be verified based on the knowledge of the prior information for the target parameters.

In an aspect, the association component 140 may also enforce the slightly stronger condition that $a^\dagger(\theta_k)Ra(\theta_k)>0$, for every k and that $a^\dagger(\theta_k)Ra(\theta_{k'})=0$ for every k and k' $\in \varepsilon_k$. To guard against receiver noise, the association component 140 may attempt to maximize $a^\dagger(\theta_k)Ra(\theta_k)$ for all targets. Symbolically, the association component 140 may solve an ambiguity-aware beamforming problem as:

$$\text{Maximize for } R \in C^{N \times N} \min_{k \in 1,2,\ldots,K} a^\dagger(\theta k)Ra(\theta k)$$

subject to $a^\dagger(\theta_k)Ra(\theta_{k'})=0$, for all k $\in$ 1, 2, ..., K and k' $\in \varepsilon_k$,
tr(R)=1, and
R ⪰ 0, which denotes that the matrix R is positive semidefinite, which implies that R is Hermitian. In an aspect, the term $|h_k| \|b(\theta_k)\|^2$ may be added to the objective function of the ambiguity-aware beamforming problem. This term, however, does not change the nature of the problem discussed above and is omitted for simplicity. Further, the hard zero-forcing constraint $a^\dagger(\theta_k)Ra(\theta_{k'})=0$ may be replaced by a weaker constraint that the interfering signal contribution is below a noise floor.

In an aspect, the structure of the ambiguity-aware beamforming problem can be described by an ambiguity graph. An ambiguity graph may include vertices {1, 2, ..., K} for each object 102 that is tracked as a target, and an edge between each vertex k and k' if k' $\in \varepsilon_k$. Since k' $\in \varepsilon_k$ if and only if k $\in \varepsilon_{k'}$, by construction, the ambiguity graph may be undirected.

Figure 3:
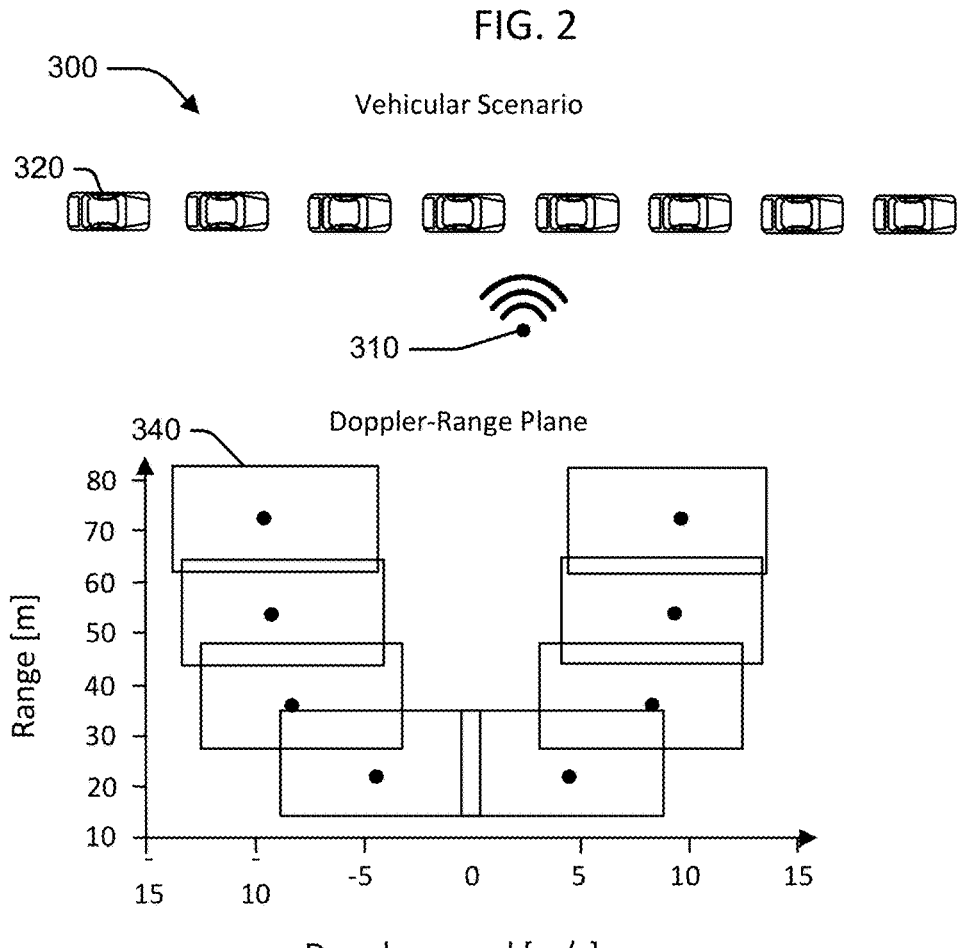
FIG. 3 is a conceptual diagram showing an example object, corresponding gating sets, and a corresponding ambiguity graph.

FIG. 3 illustrates an example vehicular scenario 300 with a radar 310 at a cross road on which several cars 320 are driving in the same direction. The corresponding expected values of the target parameters are shown by dots together with rectangular gates 340 $[\tau_k^-, \tau_k^+] \times [\omega_k^-, \omega_k^+]$. As can be seen in FIG. 3, in this scenario, only the gating sets of neighboring vehicles intersect. The resulting ambiguity graph 350 shows edges 352 only between the adjacent nodes. That is, in this scenario 300, ambiguity in the association step is only prevalent between the adjacent nodes, which will lead to a much different solution to the ambiguity-aware beamforming problem than an assumption that ambiguity exists between all nodes (i.e., a complete ambiguity graph).

In an aspect, the association component 140 may solve the ambiguity-aware beamforming problem using interior point methods. The function $a^\dagger(\theta k)Ra(\theta k)$ is linear in R and hence, in particular, concave. Since the minimum of concave functions is again concave, this implies that the objective function of the ambiguity-aware beamforming problem is concave in R. The conditions $a^\dagger(\theta_k)Ra(\theta_{k'})=0$ and tr(R)=1 are linear in R. Further, the positive semidefiniteness constraint, R ⪰ 0, describes a convex set. Thus, the ambiguity-aware beamforming problem is a convex problem, which can actually be rewritten as a semidefinite program (as can be verified by introducing a slack variable to handle the minimization over k).

FIG. 4A illustrates example beam patterns for three targets with N=3 uniformly spaced antennas at half-wavelength separation and with K=3 targets at azimuth angles $\theta_1=-60°$, $\theta_2=0°$, and $\theta_3=60°$. A first optimal transmit beam pattern 410 $a^\dagger(\theta)Ra(\theta k)$ as a function of azimuth angle θ for target k=1 is shown in FIG. 4A, assuming that the ambiguity graph is complete (i.e., $\varepsilon_k \triangleq \{1, 2, \ldots, K\} \setminus \{k\}$ for each k so that the ambiguity graph has an edge between every pair of targets). A second optimal transmit beam pattern 420 is based on an ambiguity-aware solution in which the ambiguity graph only includes edges between adjacent nodes. Similarly, FIGS. 4B and 4C illustrate the respective first optimal beam pattern 410 and the second optimal beam pattern 420 for targets k=2 and k=3, respectively.

Comparing the two curves in FIGS. 4A-4C, two key differences are apparent. First, the beam pattern 410 for the complete ambiguity graph has an additional null in FIGS. 4A and 4C. Second, by not having to enforce these nulls, the beam pattern 420 for the partial ambiguity graph is able to increase the SNR at the desired target by 4.3 dB (from −3.2 dB to 1.1 dB). Thus, taking the reduced ambiguity between the targets (captured by the ambiguity graph being incomplete) into account in an ambiguity-aware solution can yield an SNR gain.

Figure 5:
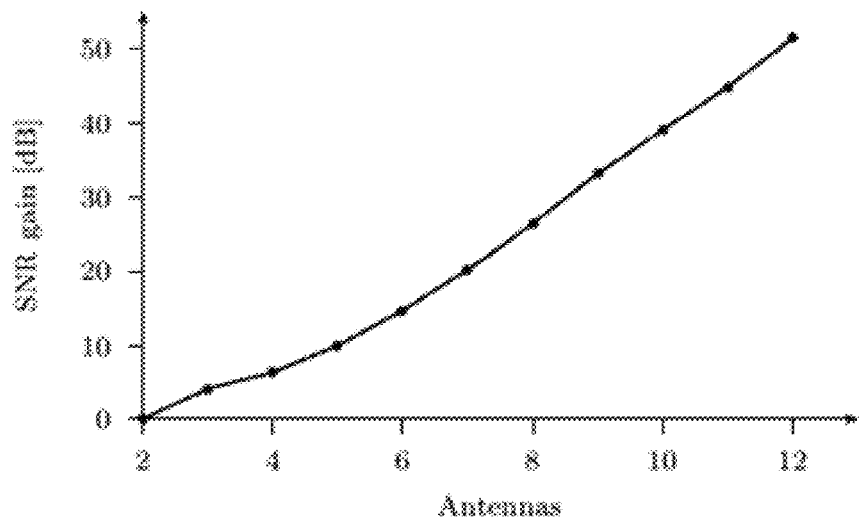
FIG. 5 is a chart showing example SNR gain of ambiguity-aware beamforming patterns.

The gains discussed above can be extended to a case of N uniformly spaced antennas at half-wavelength separation and with K=N targets. Target k $\in$ {1, 2, ..., K} has azimuth angle $\theta_k \triangleq ((2k-1)/K-1)90°$. That is, the targets are uniformly spaced in azimuth. FIG. 5 illustrates the SNR gain between the optimal beamforming matrices designed for a complete ambiguity graph and for a partially connected graph with edges only between neighboring targets k and k+1 for all k $\in$ {1, 2, ..., K−1} as a function of the number of transmit antennas N. As illustrated, explicitly taking the target ambiguity into account can yield a sizeable SNR gain that increases with the problem size. In other words, for the same number of targets, the radar device 110 can produce improved detection and estimation performance.

Ambiguity-aware beamforming can also yield an identifiability gain, meaning that, for the same number of antennas, the radar device 110 can track more targets. In the above example of N uniformly spaced antennas, the number of targets K may be allowed to vary, and a maximum number of targets, K*, may be determined. K* may be defined as the largest K for which the ambiguity-aware beamforming problem is feasible (i.e., there exists R satisfying all the constraints, including that tr(R)=1, which prevents R=0).

Figure 6:
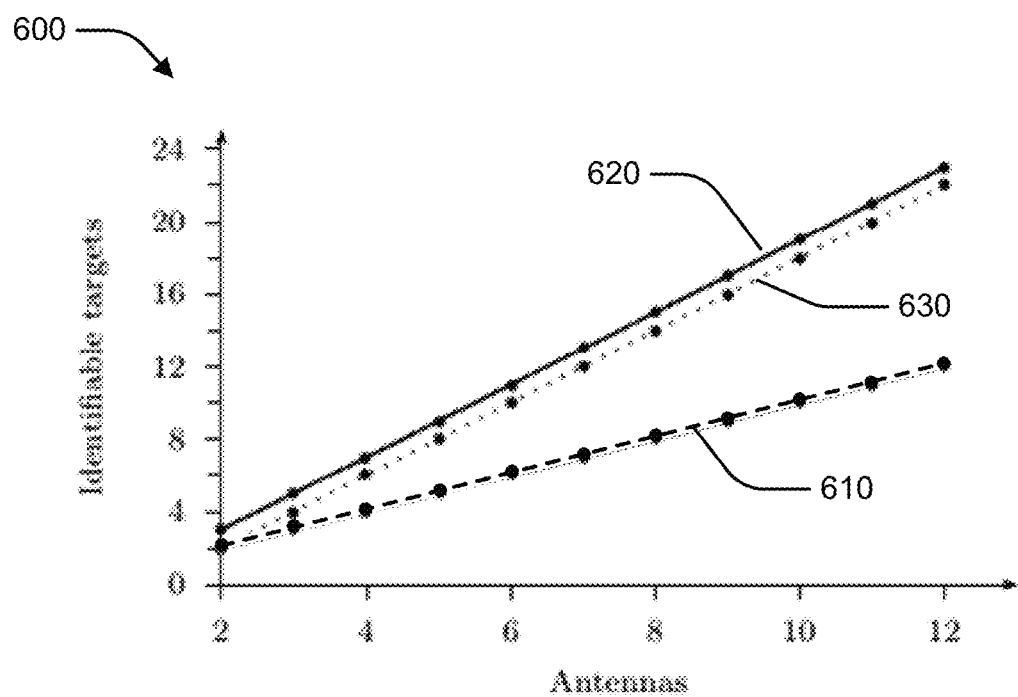
FIG. 6 is a chart showing example gain in identifiable targets using ambiguity-aware beamforming patterns.

FIG. 6 is a chart 600 showing the number of (evenly spaced) identifiable targets for a system with N antennas. A line 610 indicates the number of targets using a complete ambiguity graph assumption. A line 620 indicates the numerically computed value of K* for the partial ambiguity graph. A line 630 indicates an analytical lower bound of the line 620. As illustrated in FIG. 6, the number of identifiable targets K* is 2N−1, i.e., is almost doubled. Thus, explicitly taking the target ambiguity into account can also yield a sizeable identifiability gain that again increases with the problem size.

Returning to FIG. 1, the beam generation component 150 may solve the ambiguity-aware beamforming problem to determine a beamforming matrix. In an aspect, the beam generation component 150 may determine the beamforming matrix based on an ambiguity graph selected by the association component 140 or gating sets that, in turn, determine the ambiguity graph. The choice of gating sets has two effects. First, the choice corresponds to an ambiguity graph G with an edge set defined by $\varepsilon_k$, which in turn determines the value SNR(G) of the optimal beamforming solution. This value of SNR captures the performance of the estimation problem. Second, the choice of gating set determines the probability of successful association of target detections to target tracks, which is denoted by $P_c(G)$.

There is a trade-off between these two effects: increasing SNR(G) decreases $P_c(G)$. At one extreme, for the complete graph G containing all $K(K-1)/2$ edges, the association problem becomes relatively simple and hence $P_c(G)$ is large, since the received filter tuned to a particular azimuth angle $\theta_k$ nulls out the interference of all other targets k'≠k. However, SNR(G) is minimized since the beam generation component 150 creates beams with $K(K-1)/2$ nulls. At the other extreme, for the empty graph G containing no edges, SNR(G) is maximized, since the beams can be chosen without any nulling constraints. However, the association problem is relatively difficult and hence $P_c(G)$ is small, since the received filter tuned to a particular azimuth angle $\theta_k$ contains interference from all other targets k'≠k. Formally, the detection-association trade-off is given by the set of all Pareto-optimal pairs of the form (SNR(G), $P_c(G)$) parameterized by graphs G with vertex set $\{1, 2, \ldots, K\}$. An ambiguity graph may be considered optimal if the corresponding pair (SNR(G), $P_c(G)$) is Pareto optimal. Since there are $2^{K(K-1)/2}$ possible graphs with vertex set $\{1, 2, \ldots, K\}$, finding optimal ambiguity graphs represents a nontrivial combinatorial optimization problem. The association component 140 may use a design heuristic for constructing close to optimal ambiguity graphs.

Figure 7:
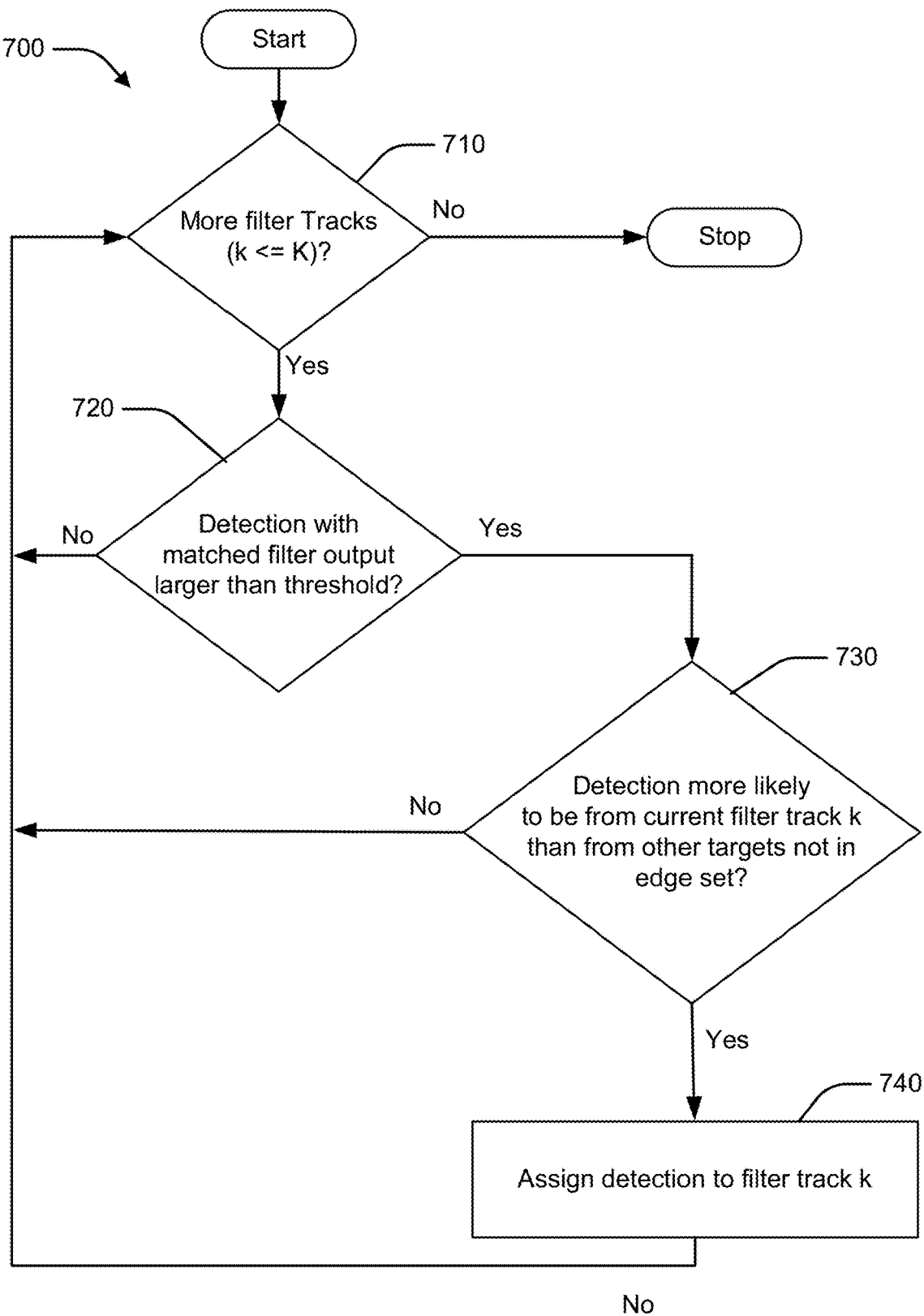
FIG. 7 is a flow diagram showing an example method of ambiguity-aware nearest-neighbor association.

FIG. 7 illustrates an example method 700 that the association component 140 may execute to evaluate an ambiguity graph. In block 710, the association component 140 may evaluate each filter track k. In block 720, the association component 140 may tune its matched filter to target azimuth angle $\theta_k$. It may then determine detections having matched filter output larger than a threshold. At block 730, the association component 140 may select the detections that are more likely to be from target k than from other targets not in edge set $\varepsilon_k$. At block 740, the association component 140 may assign the selected detection to a target track for the target. The association component 140 may repeat the method 700 starting at block 710 for each filter track (i.e., previously detected target).

In an aspect, instead of optimizing (SNR(G), $P_c(G)$) directly, the beam generation component 150 may use the lower bound on $P_c(G)$ as a substitute. Assuming the received signal is noiseless and a detection threshold of zero is used, the probability of correct association is lower bounded by $$P_c(G) \geq \mathbb{P}((\tau_k,\omega_k) \in S_k \text{ for all } k \in \{1,2,\ldots,K\}).$$

The association component 140 may choose the gating sets $\{S_k\}_{K=1}^{K}$ corresponding to the ambiguity graph G. In order for the gating sets to be consistent, $S_k \cap S_{k'} = \emptyset$ for all k and k' $\notin \varepsilon_k$. A nearest neighbor gating set may be defined as:

$$S_{k,k'} \triangleq \{(\tau,\omega): f_k(\tau,\omega) > f_{k'}(\tau,\omega)\},$$

where $f_k(\tau, \omega)$ is the probability density for the prior information on $(\tau_k, \omega_k)$. Additionally:

$$S_k \triangleq \bigcap_{k' \notin \varepsilon_k} S_{k,k'} = \{(\tau,\omega): f_k(\tau,\omega) > \max_{k' \notin \varepsilon_k} f_{k'}(\tau,\omega)\}$$

may be the set of $(\tau, \omega)$ pairs that are more likely to occur from $(\tau_k, \omega_k)$ than from any of the non-neighbors $(\tau_{k'}, \omega_{k'})$ in the graph G.

Figure 8:
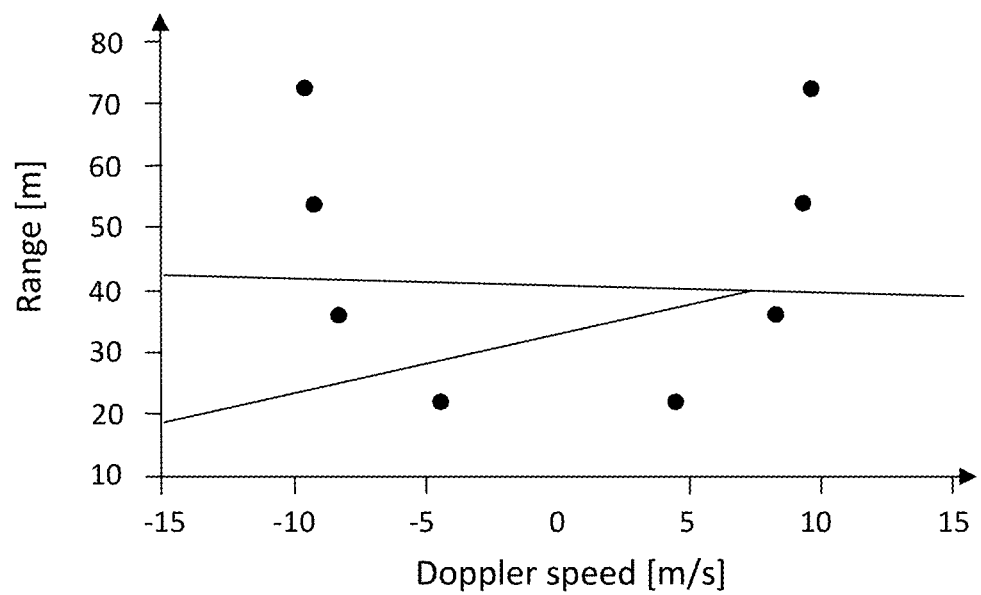
FIG. 8 is a diagram showing example nearest-neighbor gating sets.

FIG. 8 illustrates an example of ambiguity-aware nearest-neighbor gating sets $S_k$ for the scenario in FIG. 3. For clarity, only two gating sets $S_5$ and $S_7$ are shown. Since the targets 5 and 7 are not connected by an edge in the graph in FIG. 3, the corresponding gating sets are disjoint. The illustrated example assumes equal-variance Gaussian priors, resulting in convex polygonal regions. However, the definition of $S_k$ applies to arbitrary prior distributions, and the resulting regions may not be polygons and may not be convex.

Applying the ambiguity-aware nearest-neighbor association and a union on the gating sets, $$P_c(G) \geq \mathbb{P}\left((\tau_k,\omega_k) \in \bigcap_{k' \notin \varepsilon_k} S_{k,k'} \text{ for all } k\right) =$$
$$1 - \mathbb{P}\left((\tau_k,\omega_k) \in \bigcup_{k' \notin \varepsilon_k} S_{k,k'}^C \text{ for some } k\right) \geq$$
$$1 - K^2 \max_{(k,k'): k' \notin \varepsilon_k} \mathbb{P}((\tau_k,\omega_k) \notin S_{k,k'}).$$

This last lower bound is a function of only the most difficult to disambiguate pair of targets (k, k') not connected by an edge in the ambiguity graph G.

With this substitution of the lower bound, the optimizing G can be readily found. SNR(G) does not decrease (and usually increases) whenever an edge is removed from G. At the same time, the lower bound stays constant whenever an edge is removed from G that is not achieving the maximum probability of pairwise error. This implies that all optimal (for the modified criterion) ambiguity graphs have edge sets of the form:

$$\varepsilon_k = \{k' \neq k: P((\tau_k,\omega_k) \notin S_{k,k'}) \geq \gamma\}$$

for a threshold parameter γ. That is, all target pairs that are pairwise more difficult to disambiguate than the threshold parameter γ from an edge in the ambiguity graph. The corresponding ambiguity graph may be referred to as $G_\gamma$. The beam generation component 150 may sweep the threshold parameter γ from 0 to ∞ to create a sequence of K (K−1)/2 optimal graphs $G_\gamma$, which trace out the detection-association trade-off (SNR($G_\gamma$), $P_c(G_\gamma)$). That is, any graph $G_\gamma$ may provide an approximately Pareto-optimal solution. The beam generation component 150 may select a graph $G_\gamma$ based on a predefined rule (e.g., select middle graph to balance SNR($G_\gamma$) and $P_c(G_\gamma)$) or based on a current detection scenario (e.g., maximize number of targets when in heavy traffic).

Figure 9:
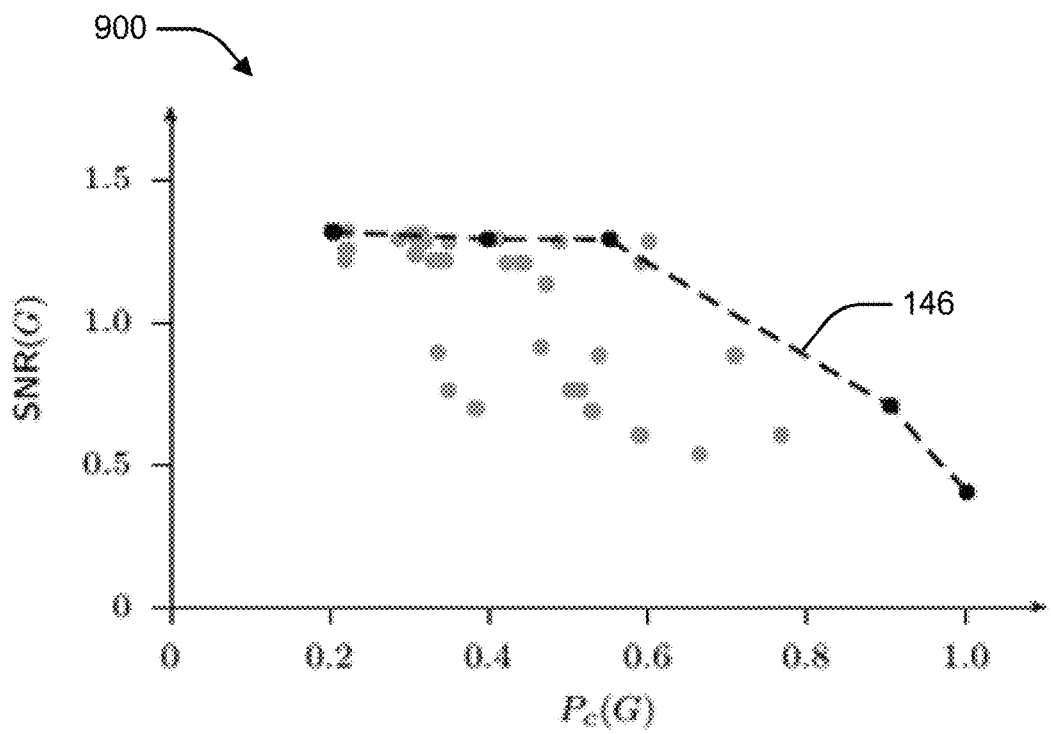
FIG. 9 is a chart showing an example detection-association tradeoff.

FIG. 9 is a chart 900 showing an example of a detection-association tradeoff 146 between SNR(G) and $P_c(G)$. The connected black dots indicate the (SNR($G_\gamma$), $P_c(G_\gamma)$) pairs for different values of the threshold parameter γ. For comparison, the unconnected grey dots show an exhaustive enumeration of (SNR(G), $P_c(G)$) for all $2^{K(K-1)/2}$ possible ambiguity graphs. The chart 900 shows 64 possible ambiguity graphs for a scenario with 4 antennas and 4 targets.

Figure 10:
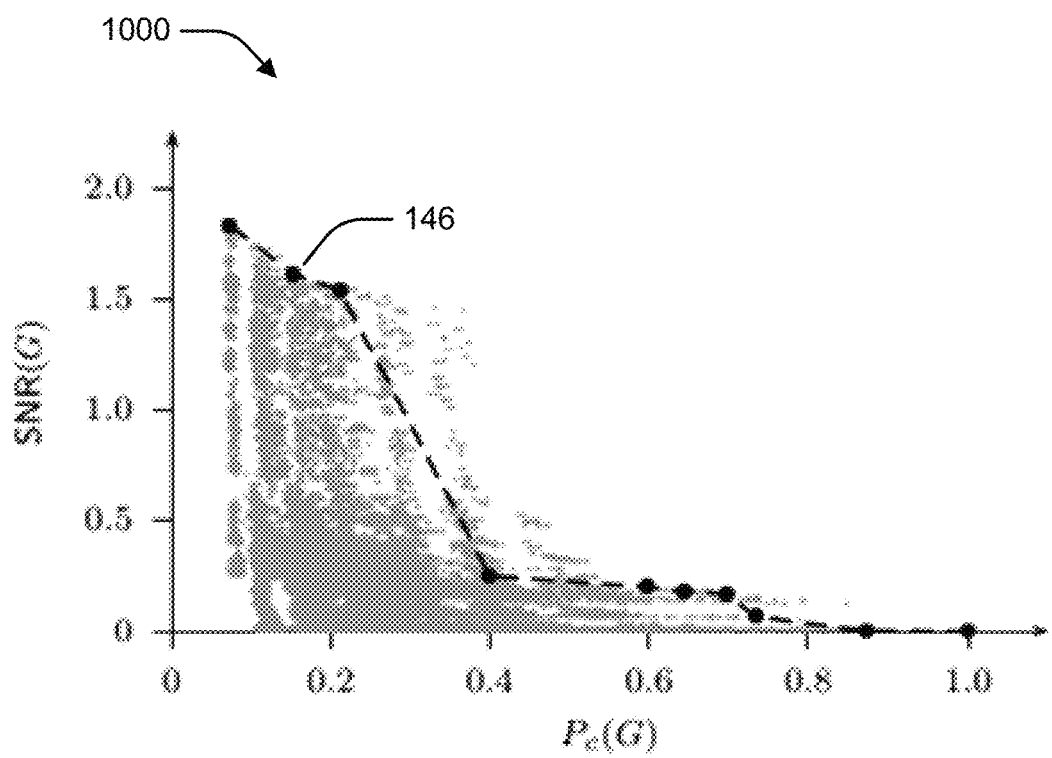
FIG. 10 is a chart showing another example detection-association tradeoff.

FIG. 10 is a chart 1000 showing another example of a detection-association tradeoff 146 between SNR(G) and $P_c(G)$ for a scenario with 6 antennas and 6 targets. The chart 1000 includes a total of 32,768 possible graphs. As can be seen in charts 900 and 1000, the ambiguity graphs that provide SNR($G_\gamma$), $P_c(G_\gamma)$ for the threshold parameter γ are close to the optimal values. That is, very few other ambiguity graphs outperform $G_\gamma$ on either SNR(G) or $P_c(G)$.

The beam generation component 150 may select a beamforming matrix R based on the selected ambiguity graph, for example, the selected graph $G_\gamma$.

In an aspect, the beamforming matrix R may be defined as $$R(F_k, G_k) \triangleq U_k F_k U_k^\dagger + V_k G_k V_k^\dagger,$$

where $F_k \in C^{(N-|\varepsilon_k|) \times (N-|\varepsilon_k|)}$ and $G_k \in C^{(N-1) \times (N-1)}$ are arbitrary positive semidefinite matrices. $R(F_k, G_k)$ is, therefore, also positive semidefinite. For $k \in \{1, 2, \ldots, K\}$, a matrix whose columns are an orthonormal basis for the orthogonal complement of the subspace spanned by $a(\theta k)$, $k' \in \varepsilon_k$ may be denoted by $U_k \in C^{N \times (N-|\varepsilon_k|)}$. In other words, $U_k^\dagger U_k = I$, and $U_k^\dagger a(\theta_{k'}) = 0$ for all $k' \in \varepsilon_k$. Further, $V_k \in C^{N \times (N-1)}$ may denote a matrix whose columns are an orthonormal basis for the orthogonal complement of the subspace spanned by $a(\theta k)$. In other words, $V_k^\dagger V_k = I$, and $V_k^\dagger a(\theta k) = 0$. The choice of $U_k$ and $V_k$ is not unique.

The beam generation component 150 may construct a beamforming matrix based on the selected ambiguity graph 142. From the above discussion, one way to construct a beamforming matrix R is to choose $F_k$ and $G_k$ for $k \in \{1, 2, \ldots, K\}$ such that $R = R(F_1, G_1) = \ldots = R(F_K, G_K)$, and the trace constraint $tr(R) = 1$ is satisfied. Formally, a solution to the ambiguity-aware beamforming problem can be found by solving $$\max_{F_k, G_k \forall k} \min_{k \in \{1,2,\ldots,k\}} a(\theta_k)^\dagger U_k F_k U_k^\dagger a(\theta_k)$$

Subject to $R(F_k, G_k) = R(F_1, G_1)$, for all $k \in \{2, 3, \ldots, K\}$, $tr(F_1) + tr(G_1) = 1$, $F_k \succcurlyeq 0$, for all $k \in \{1, 2, \ldots, K\}$, and
$G_k \succcurlyeq 0$, for all $k \in \{1, 2, \ldots, K\}$.

Figure 11:
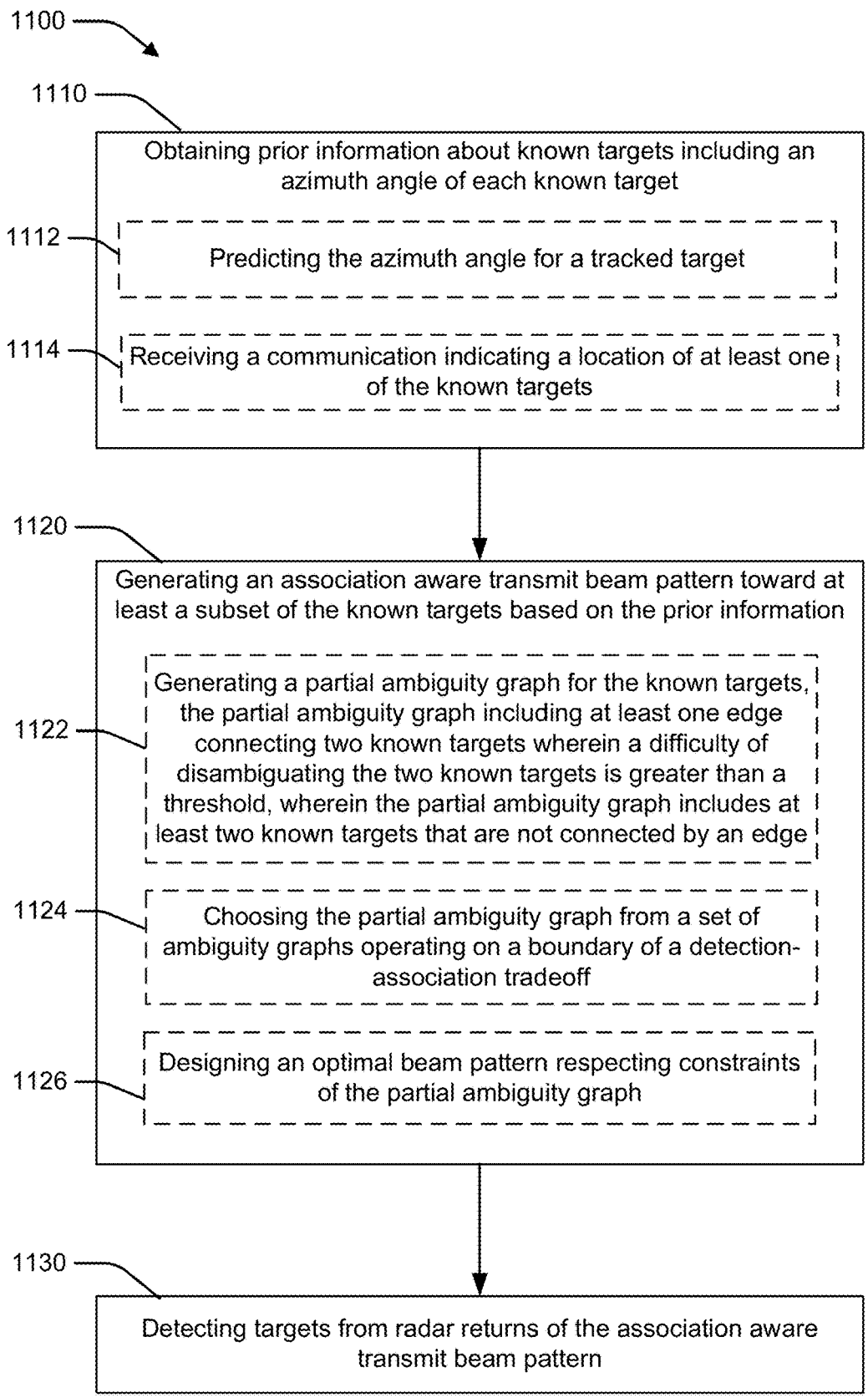
FIG. 11 is a flow diagram of an example method of operating a radar.

FIG. 11 is a flow diagram showing an example method 1100 of operation of a radar device 110. The method 1100 may be performed by the radar device 110 to detect objects 102 near the radar device 110.

At block 1110, the method 1100 may include obtaining prior information about known targets including an azimuth angle of each known target. In an aspect, for example, the prediction component 130 may obtain the prior information about the known targets including the azimuth angle $\theta$ of each known target. For example, at sub-block 1112, obtaining the prior information may include predicting the azimuth angle for a tracked target. In an aspect, for example, the prediction component 130 may predict the azimuth angle for the tracked target. In one aspect, the prediction component 130 may predict the azimuth angle based on a prior detection. For instance, the prediction component 130 may determine a trajectory of an object 102 based on the prior detection and estimate a current position of the object 102. In sub-block 1114, obtaining the prior information may include receiving a communication indicating a location of at least one of the known targets. In an aspect, for example, the communications component 136 may receive the communication indicating the location of at least one of the known targets. The communication may be, for example, a wireless transmission from the known target. The prediction component 130 may compare the location of the at least one of the known targets with a location of the radar device 110 based on, for example, the GPS 132 or the sensor system 134.

At block 1120, the method 1100 may include generating an association aware transmit beam pattern toward at least a subset of the known targets based on the prior information. In an aspect, for example, the association component 140 may generate the association aware transmit beam pattern toward at least the subset of the known targets based on the prior information. In an aspect, at sub-block 1122, generating the association aware transmit beam pattern may include generating a partial ambiguity graph for the known targets.

For example, the association component 140 may generate the ambiguity graph 142, which may be a partial ambiguity graph. That is, the ambiguity graph 142 may include at least one edge connecting two known targets wherein a difficulty of disambiguating the two known targets is greater than a threshold. Additionally, the ambiguity graph 142 may include at least two known targets that are not connected by an edge. In an aspect, at sub-block 1124, generating the association aware transmit beam pattern may include choosing the partial ambiguity graph from a set of ambiguity graphs operating on a boundary of a detection-association tradeoff. For example, the association component 140 may choose the partial ambiguity graph 142 from a set of ambiguity graphs operating on a boundary of a detection-association tradeoff 146. As illustrated in FIGS. 8 and 9, the detection-association tradeoff 146 may be a set of Pareto-optimal graphs determined by sweeping a threshold parameter $\gamma$ for a lower bound of $P_c(G)$. In another aspect, at sub-block 1126, generating the association aware transmit beam pattern may include designing an optimal beam pattern respecting constraints of the ambiguity graph. In an aspect, for example, the beam generation component 150 may design an optimal beam pattern respecting constraints of the ambiguity graph 142. In an aspect, the beam generation component 150 may solve the ambiguity-aware beamforming problem based on the ambiguity graph 142 as G to solve for R.

In block 1130, the method 1100 may include detecting targets from reflected beams of the association aware transmit beam pattern. In an aspect, for example, the detection component 160 may detect targets from the reflected beams of the association aware transmit beam pattern. In an aspect, for example, the detection component 160 may use matched filters to detect targets from the reflected beams. The detection component 160 may associate the detected targets with the tracked targets. Further details of detecting targets from reflected beams are described above with respect to FIG. 7.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

SOME FURTHER EXAMPLE EMBODIMENTS

An example method of radar detection, comprising: obtaining prior information about known targets including an azimuth angle of each known target; generating an association aware transmit beam pattern toward at least a subset of the known targets based on the prior information; and detecting targets from reflected beams of the association aware transmit beam pattern.

The above example method, wherein obtaining the prior information comprises predicting the azimuth angle for a tracked target.

Any of the above example methods, wherein obtaining the prior information comprises receiving a communication indicating a location of at least one of the known targets.

Any of the above example methods, wherein generating the association aware transmit beam pattern comprises generating a partial ambiguity graph for the known targets, the graph including at least one edge connecting two known targets wherein a difficulty of disambiguating the two known targets is greater than a threshold, wherein the graph includes at least two known targets that are not connected by an edge.

Any of the above example methods, wherein generating the association aware transmit beam pattern comprises choosing the partial ambiguity graph from a set of ambiguity graphs operating on a boundary of a detection-association tradeoff.

Any of the above example methods, wherein generating the association aware transmit beam pattern comprises designing a beam pattern respecting constraints of the ambiguity graph.

Any of the above example methods, wherein detecting targets from reflected beams of the association aware transmit beam pattern comprises: tuning a matched filter to the target azimuth angle of a known target to evaluate a filter track of the known target; determining detections having matched filter output larger than a threshold; selecting a detection that is more likely to be from the known target than from other targets not in an edge set; and assigning the selected detection to the filter track for the known target.

Any of the above example methods, further comprising evaluating a filter track for each known target.

A first example radar, comprising: a plurality of antennas; a memory storing executable instructions; and a processor communicatively coupled with the plurality of antennas and with the memory. The processor is configured to: obtain prior information about known targets including an azimuth angle of each known target; generate an association aware transmit beam pattern toward at least a subset of the known targets based on the prior information; and detect targets from reflected beams of the association aware transmit beam pattern.

The above first example radar, wherein the processor is configured to predict the azimuth angle for a tracked target.

Any of the above first example radars, wherein the processor is configured to receive a communication indicating a location of at least one of the known targets.

Any of the above first example radars, wherein the processor is configured to generate a partial ambiguity graph for the known targets, the graph including at least one edge connecting two known targets wherein a difficulty of disambiguating the two known targets is greater than a threshold, wherein the graph includes at least two known targets that are not connected by an edge.

Any of the above first example radars, wherein the processor is configured to choose the partial ambiguity graph from a set of ambiguity graphs operating on a boundary of a detection-association tradeoff.

Any of the above first example radars, wherein the processor is configured to design a beam pattern respecting constraints of the ambiguity graph.

Any of the above first example radars, wherein the processor is configured to: tune a matched filter to the target azimuth angle of a known target to evaluate a filter track of the known target; determine detections having matched filter output larger than a threshold; select a detection that is more likely to be from the known target than from other targets not in an edge set; and assign the selected detection to the filter track for the known target.

Any of the above first example radars, wherein the processor is configured to evaluate a filter track for each known target.

A second example radar, comprising: means for obtaining prior information about known targets including an azimuth angle of each known target; means for generating an association aware transmit beam pattern toward at least a subset of the known targets based on the prior information; and means for detecting targets from reflected beams of the association aware transmit beam pattern.

The above second example radar, wherein the means for obtaining the prior information is configured to predict the azimuth angle for a tracked target.

Any of the above second example radars, wherein the means for obtaining the prior information is configured to receive a communication indicating a location of at least one of the known targets.

Any of the above second example radars, wherein the means for generating the association aware transmit beam pattern is configured to generate a partial ambiguity graph for the known targets, the graph including at least one edge connecting two known targets wherein a difficulty of disambiguating the two known targets is greater than a threshold, wherein the graph includes at least two known targets that are not connected by an edge.

Any of the above second example radars, wherein the means for generating the association aware transmit beam pattern is configured to choose the partial ambiguity graph from a set of ambiguity graphs operating on a boundary of a detection-association tradeoff.

Any of the above second example radars, wherein the means for generating the association aware transmit beam pattern is configured to design a beam pattern respecting constraints of the ambiguity graph.

Any of the above second example radars, wherein the means for detecting targets from reflected beams of the association aware transmit beam pattern is configured to: tune a matched filter to the target azimuth angle of a known target to evaluate a filter track of the known target; determine detections having matched filter output larger than a threshold; select a detection that is more likely to be from the known target than from other targets not in an edge set; and assign the selected detection to the filter track for the known target.

Any of the above second example radars, wherein the means for detecting targets from reflected beams of the association aware transmit beam pattern is configured to evaluate a filter track for each known target.

An example non-transitory computer-readable medium storing instructions executable by a processor of a radar device, the computer-readable medium comprising code to: obtain prior information about known targets including an azimuth angle of each known target; generate an association aware transmit beam pattern toward at least a subset of the known targets based on the prior information; and detect targets from reflected beams of the association aware transmit beam pattern.

The above example non-transitory computer-readable medium, wherein the code to obtain prior information about known targets comprises code to predict the azimuth angle for a tracked target.

Any of the above example non-transitory computer-readable mediums, wherein the code to obtain prior information about known targets comprises code to receive a communication indicating a location of at least one of the known targets.

Any of the above example non-transitory computer-readable mediums, wherein the code to generate an association aware transmit beam pattern comprises code to generate a partial ambiguity graph for the known targets, the graph including at least one edge connecting two known targets wherein a difficulty of disambiguating the two known targets is greater than a threshold, wherein the graph includes at least two known targets that are not connected by an edge.

Any of the above example non-transitory computer-readable mediums, wherein the code to generate an association aware transmit beam pattern comprises code to: choose the partial ambiguity graph from a set of ambiguity graphs operating on a boundary of a detection-association tradeoff; and design a beam pattern respecting constraints of the ambiguity graph.

Any of the above example non-transitory computer-readable mediums, wherein the code to detect targets from reflected beams comprises code to: tune a matched filter to the target azimuth angle of a known target to evaluate a filter track of the known target; determine detections having matched filter output larger than a threshold; select a detection that is more likely to be from the known target than from other targets not in an edge set; and assign the selected detection to the filter track for the known target.

What is claimed is:

1. A method of radar detection, comprising:
   obtaining prior information about known targets including an azimuth angle of each known target;
   generating an association aware transmit beam pattern toward at least a subset of the known targets based on the prior information, wherein generating the association aware transmit beam pattern comprises generating a partial ambiguity graph for the known targets, the partial ambiguity graph including at least one edge connecting two known targets wherein a difficulty of disambiguating the two known targets is greater than a threshold, wherein the partial ambiguity graph includes at least two known targets that are not connected by an edge; and
   detecting targets from reflected beams of the association aware transmit beam pattern.

2. The method of claim 1, wherein obtaining the prior information comprises predicting the azimuth angle for a tracked target.

3. The method of claim 1, wherein obtaining the prior information comprises receiving a communication indicating a location of at least one of the known targets.

4. The method of claim 1, wherein generating the association aware transmit beam pattern comprises choosing the partial ambiguity graph from a set of ambiguity graphs operating on a boundary of a detection-association tradeoff.

5. The method of claim 1, wherein generating the association aware transmit beam pattern comprises designing a beam pattern respecting constraints of the partial ambiguity graph.

6. The method of claim 1, wherein detecting targets from reflected beams of the association aware transmit beam pattern comprises:
   tuning a matched filter to the azimuth angle of each known target to evaluate a filter track of the known target;
   determining detections having matched filter output larger than a threshold;
   selecting a detection that is more likely to be from the known target than from other targets not in an edge set; and
   assigning the selected detection to the filter track for the known target.

7. The method of claim 6, further comprising evaluating the filter track for each known target.

8. A radar, comprising:
   a plurality of antennas;
   a memory storing executable instructions; and
   a processor communicatively coupled with the plurality of antennas and with the memory, the processor configured to:
   obtain prior information about known targets including an azimuth angle of each known target;
   generate a partial ambiguity graph for the known targets, the partial ambiguity graph including at least one edge connecting two known targets wherein a difficulty of disambiguating the two known targets is greater than a threshold, wherein the partial ambiguity graph includes at least two known targets that are not connected by an edge;
   generate an association aware transmit beam pattern toward at least a subset of the known targets based on the prior information; and
   detect targets from reflected beams of the association aware transmit beam pattern.

9. The radar of claim 8, wherein the processor is configured to predict the azimuth angle for a tracked target.

10. The radar of claim 8, wherein the processor is configured to receive a communication indicating a location of at least one of the known targets.

11. The radar of claim 8, wherein the processor is configured to choose the partial ambiguity graph from a set of ambiguity graphs operating on a boundary of a detection-association tradeoff.

12. The radar of claim 8, wherein the processor is configured to design a beam pattern respecting constraints of the partial ambiguity graph.

13. The radar of claim 8, wherein the processor is configured to:
   tune a matched filter to the azimuth angle of each known target to evaluate a filter track of the known target;
   determine detections having matched filter output larger than a threshold;
   select a detection that is more likely to be from the known target than from other targets not in an edge set; and
   assign the selected detection to the filter track for the known target.

14. The radar of claim 13, wherein the processor is configured to evaluate the filter track for each known target.

15. A radar, comprising:
   means for obtaining prior information about known targets including an azimuth angle of each known target;
   means for generating an association aware transmit beam pattern toward at least a subset of the known targets based on the prior information, wherein the means for generating the association aware transmit beam pattern is configured to generate a partial ambiguity graph for the known targets, the partial ambiguity graph including at least one edge connecting two known targets wherein a difficulty of disambiguating the two known targets is greater than a threshold, wherein the partial ambiguity graph includes at least two known targets that are not connected by an edge; and
   means for detecting targets from reflected beams of the association aware transmit beam pattern.

16. The radar of claim 15, wherein the means for obtaining the prior information is configured to predict the azimuth angle for a tracked target.

17. The radar of claim 15, wherein the means for obtaining the prior information is configured to receive a communication indicating a location of at least one of the known targets.

18. The radar of claim 15, wherein the means for generating the association aware transmit beam pattern is configured to choose the partial ambiguity graph from a set of ambiguity graphs operating on a boundary of a detection-association tradeoff.

19. The radar of claim 15, wherein the means for generating the association aware transmit beam pattern is configured to design a beam pattern respecting constraints of the partial ambiguity graph.

20. The radar of claim 15, wherein the means for detecting targets from reflected beams of the association aware transmit beam pattern is configured to:
   tune a matched filter to the azimuth angle of each known target to evaluate a filter track of the known target;
   determine detections having matched filter output larger than a threshold;
   select a detection that is more likely to be from the known target than from other targets not in an edge set; and
   assign the selected detection to the filter track for the known target.

21. The radar of claim 20, wherein the means for detecting targets from reflected beams of the association aware transmit beam pattern is configured to evaluate the filter track for each known target.

22. A non-transitory computer-readable medium storing instructions executable by a processor of a radar device, the non-transitory computer-readable medium comprising code to:
   obtain prior information about known targets including an azimuth angle of each known target;
   generate an association aware transmit beam pattern toward at least a subset of the known targets based on the prior information, wherein the code to generate the association aware transmit beam pattern comprises code to generate a partial ambiguity graph for the known targets, the partial ambiguity graph including at least one edge connecting two known targets wherein a difficulty of disambiguating the two known targets is greater than a threshold, wherein the partial ambiguity graph includes at least two known targets that are not connected by an edge; and
   detect targets from reflected beams of the association aware transmit beam pattern.

23. The non-transitory computer-readable medium of claim 22, wherein the code to obtain prior information about known targets comprises code to predict the azimuth angle for a tracked target.

24. The non-transitory computer-readable medium of claim 22, wherein the code to obtain prior information about known targets comprises code to receive a communication indicating a location of at least one of the known targets.

25. The non-transitory computer-readable medium of claim 22, wherein the code to generate the association aware transmit beam pattern comprises code to:
choose the partial ambiguity graph from a set of ambiguity graphs operating on a boundary of a detection-association tradeoff; and
design a beam pattern respecting constraints of the partial ambiguity graph.

26. The non-transitory computer-readable medium of claim 22, wherein the code to detect targets from reflected beams comprises code to:
tune a matched filter to the azimuth angle of each known target to evaluate a filter track of the known target;
determine detections having matched filter output larger than a threshold;
select a detection that is more likely to be from the known target than from other targets not in an edge set; and
assign the selected detection to the filter track for the known target.

\* \* \* \* \*